T. BODDE & F. E. AUSTIN.
ROAD SURVEYING MACHINE.
APPLICATION FILED JAN. 8, 1914.
1,201,139.
Patented Oct. 10, 1916.
5 SHEETS—SHEET 1.
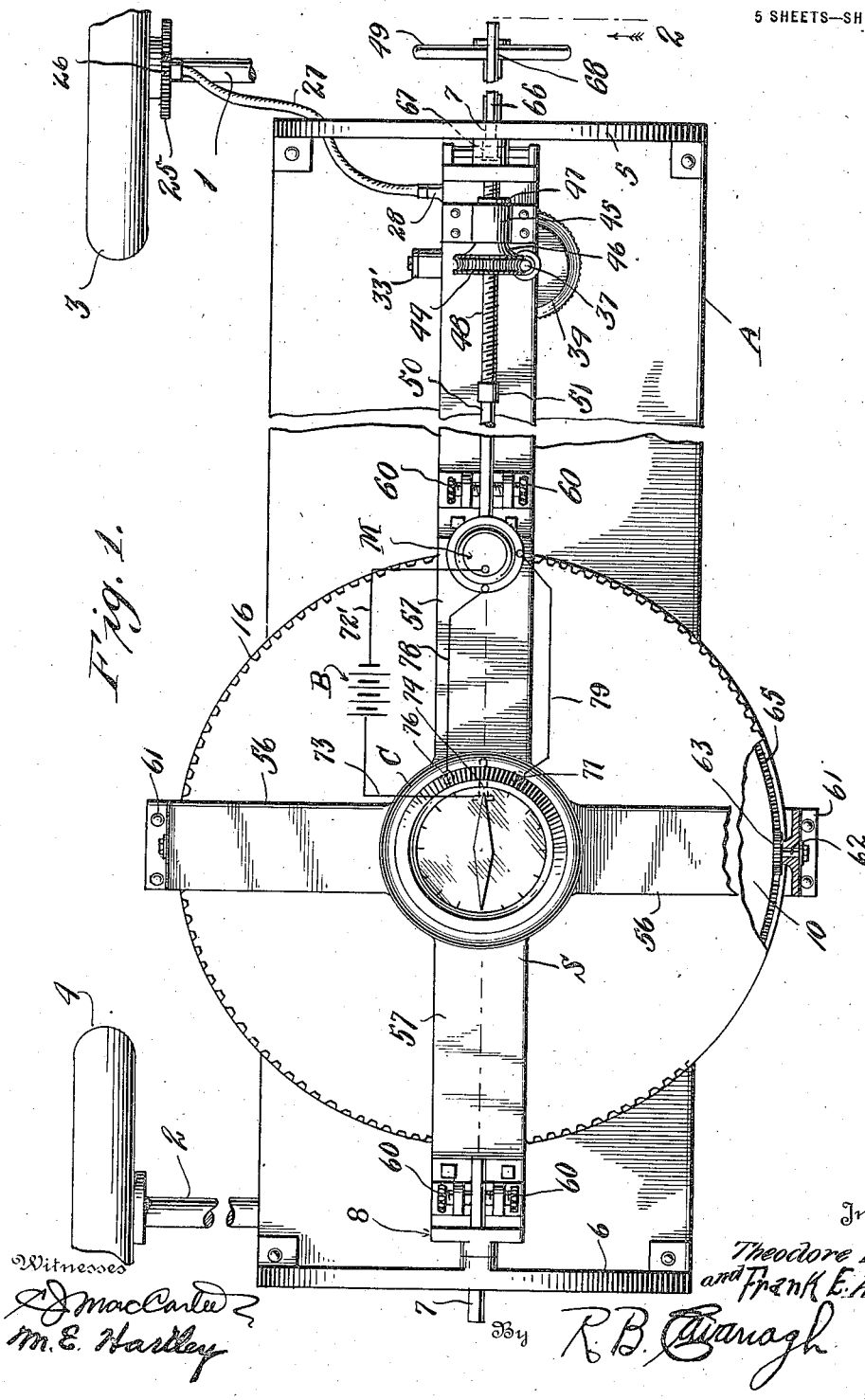

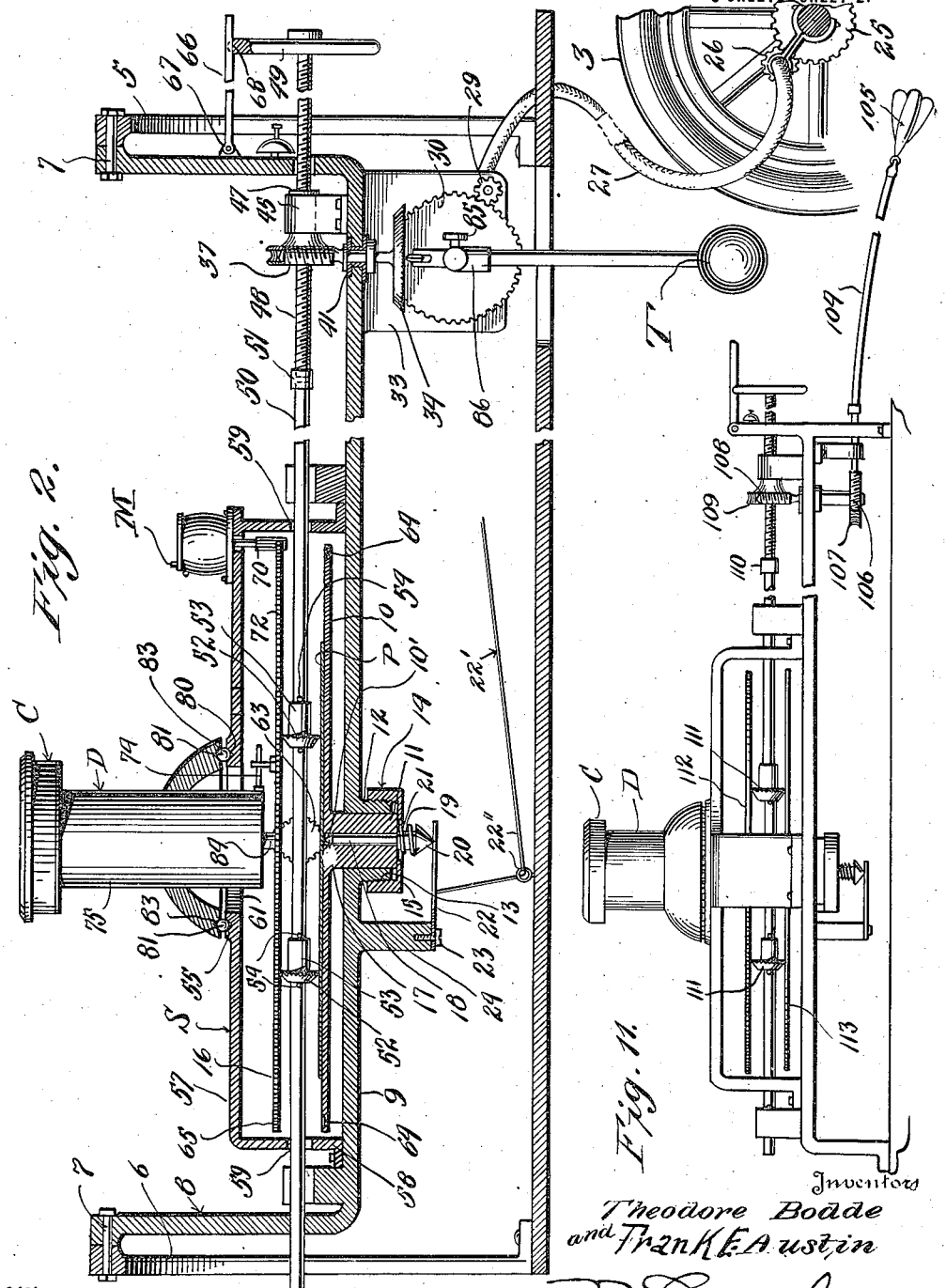

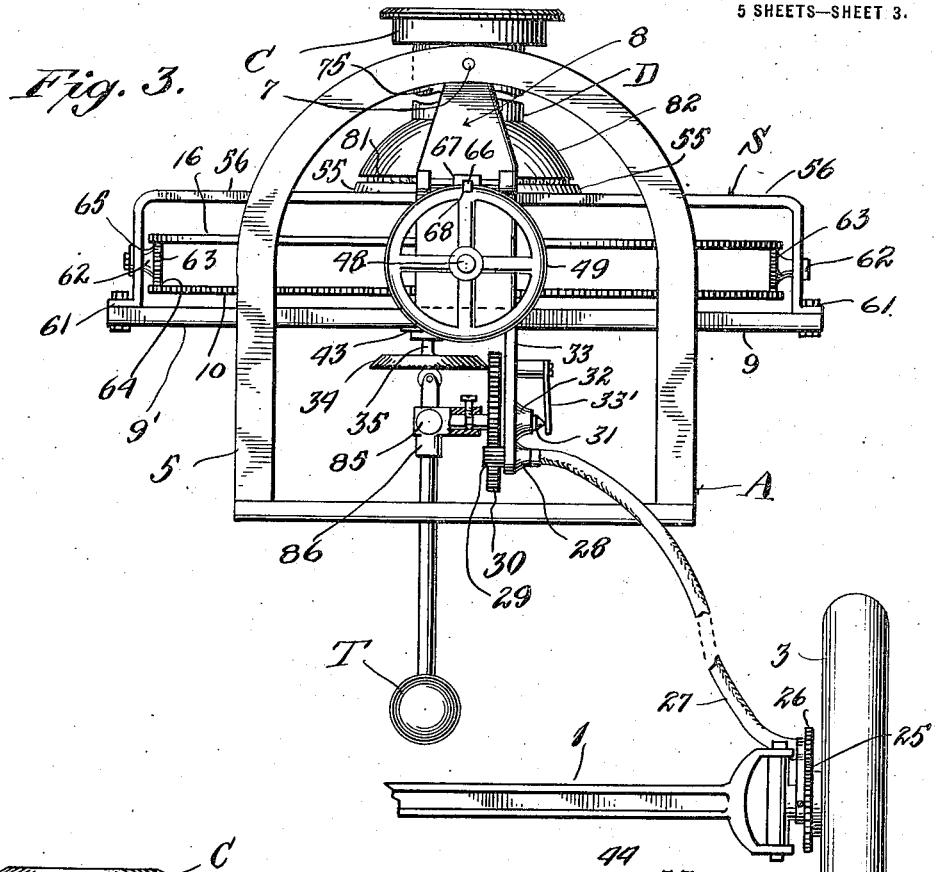
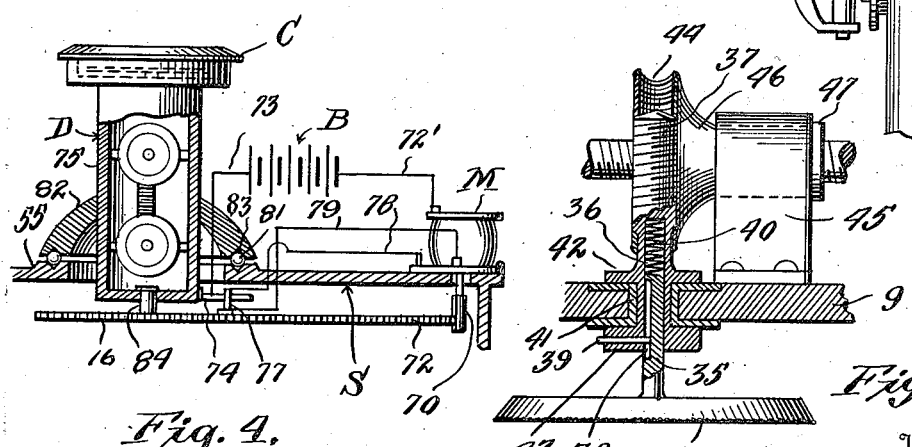

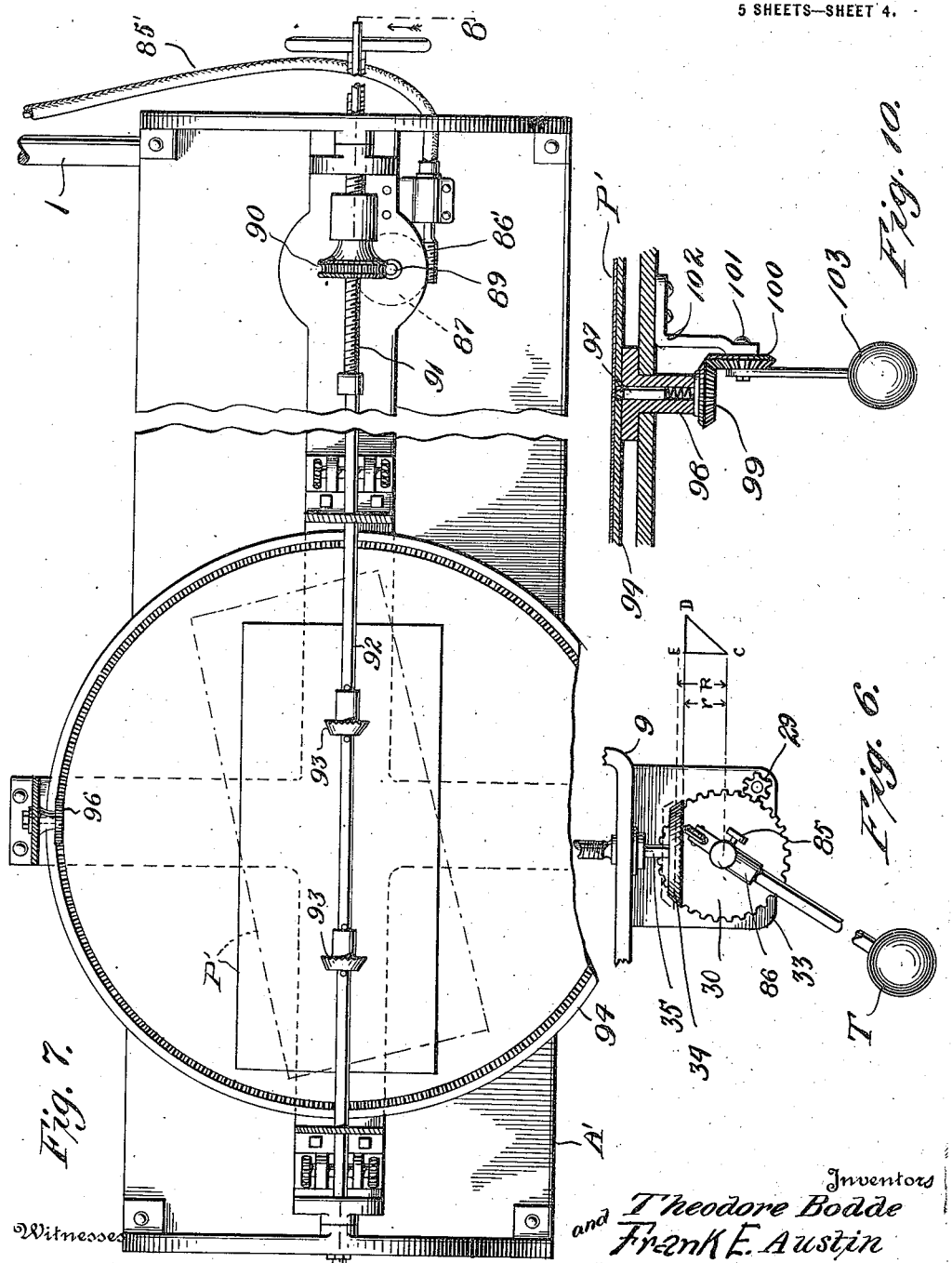

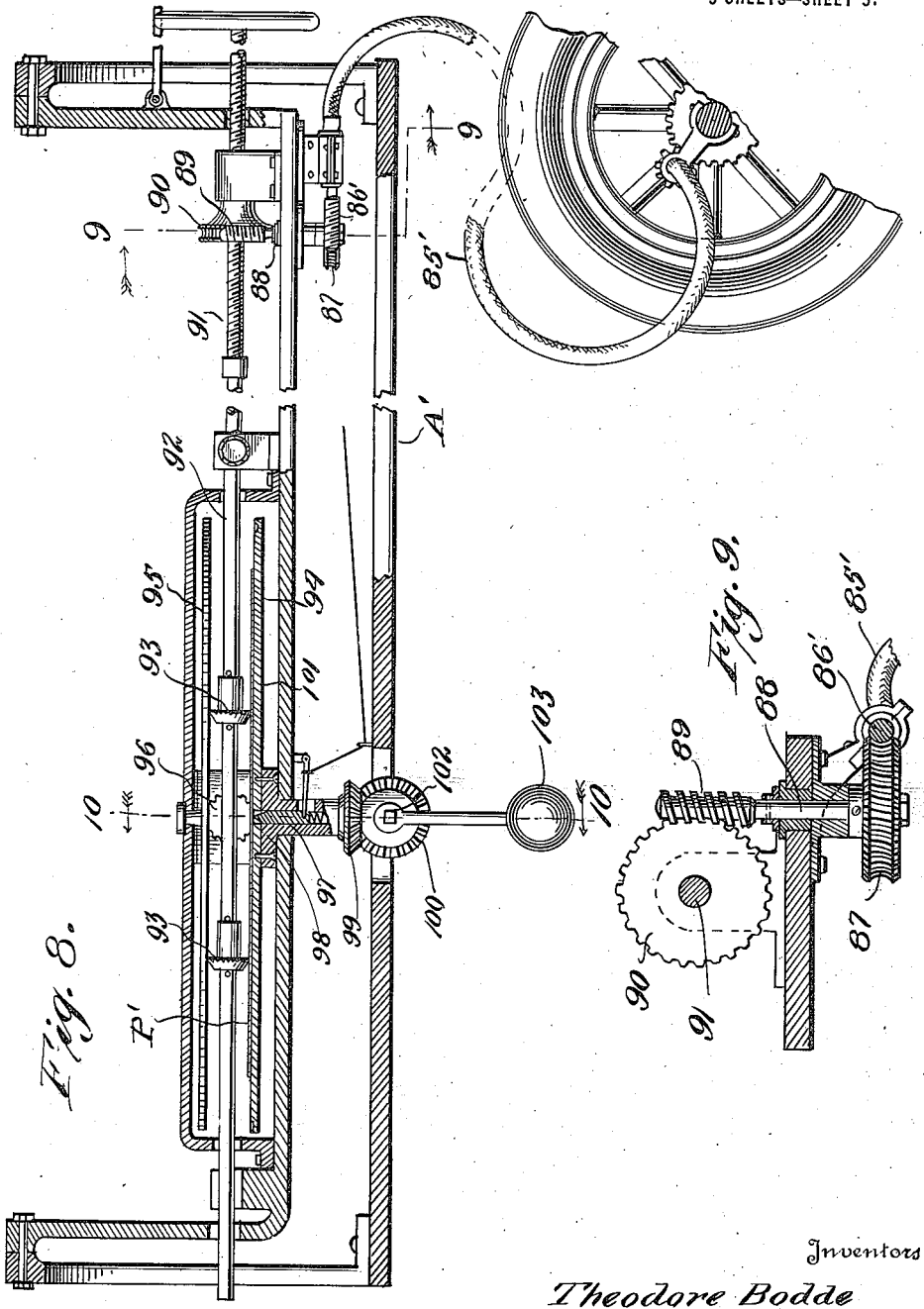

UNITED STATES PATENT OFFICE.

THEODORE BODDE, OF WESTFIELD, NEW JERSEY, AND FRANK E. AUSTIN, OF HANOVER, NEW HAMPSHIRE.

ROAD-SURVEYING MACHINE.

1,201,139.  Specification of Letters Patent.  Patented Oct. 10, 1916.

Application filed January 8, 1914. Serial No. 811,020.

*To all whom it may concern:*

Be it known that we, THEODORE BODDE, subject of the Queen of the Netherlands, residing at Westfield, in the county of Union and State of New Jersey, and FRANK E. AUSTIN, citizen of the United States, residing at Hanover, in the county of Grafton and State of New Hampshire, have invented certain new and useful Improvements in Road-Surveying Machines; and we do hereby declare the following to be a full, clear, and exact description of the invention, such as will enable others skilled in the art to which it appertains to make and use the same.

This invention relates to road surveying machines, and is in the nature of an improvement upon the invention forming the subject matter of an application of Theodore Bodde, one of the present applicants, which earlier application was filed February 28, 1913, Serial No. 751,331.

In the machine disclosed in the application aforesaid, a map when drawn in plan was liable to contain a small error due to the fact that in traveling over an uneven surface, such as a road having up and down grades, the map line measurement was not made upon a horizontal line, as is done in surveying, but was determined by the wheels of the vehicle traveling up and down grade. Consequently in the plan map made by such prior machine, it was necessary to correct this error, especially when the grades of the road being mapped exceeded five degrees. With the present machine such an error, due to the non-horizontal measurement of the road by the wheels of the vehicle, is directly and automatically corrected while the plan map is being made, so that such map when completed needs no correction as it is as accurate as if measured on a straight horizontal line, as in ordinary surveying practice.

It is also our purpose to provide a surveying machine which will possess a number of manifest advantages over the earlier Bodde machine as illustrated in the pending application aforesaid, and through the agency of which a map of the road or course traveled may be expeditiously and accurately measured while the machine is in motion.

With the above recited objects and others of a similar nature in view, our invention consists in the construction, combination and arrangement of parts set forth in and falling within the scope of the appended claims.

In the accompanying drawings: Figure 1 is a top plan view of a surveying machine embodying our invention and adapted for the making of plan maps, some of the parts being broken away. Fig. 2 is a vertical longitudinal sectional view, taken through the machine, with certain of the parts shown in elevation. Fig. 3 is a view in front elevation of a portion of the machine. Fig. 4 is a view partly in vertical section and partly in elevation of the compass device employed in connection with the machine. Fig. 5 is a view partly in section and partly in elevation of the mechanism for transmitting motion to the map-paper feeding shaft of the machine. Fig. 6 is a detail view in front elevation of the pendulum and illustrating comparatively and diagrammatically the radii of the swinging pendulum. Fig. 7 is a top plan view of a form of machine for making an elevation map, with parts broken away. Fig. 8 is a sectional view taken on the line 8—8 of Fig. 7, certain of the parts being shown in elevation. Fig. 9 is a vertical sectional view taken on the line 9—9 of Fig. 8. Fig. 10 is a similar view taken on the line 10—10 of Fig. 8. Fig. 11 is a partial view of a modified form of machine adapted for use in marking the course of ships at sea.

Referring now to the accompanying drawings in detail, and especially to Figs. 1 to 6 inclusive which pertain to a machine for making a plan map, the letter A designates a vehicle as an entirety, which is provided with the usual axles 1 and 2, the front wheels 3 and the rear wheels 4. The body of the vehicle A carries a front vertically disposed yoke frame 5 and a rear vertically disposed yoke frame 6. Between these yokes 5 and 6 is hung, by means of the pintles 7, a U-shaped hanger 8 upon the horizontal or bottom board 9 of which is mounted the map board and coöperating parts hereinafter described. The map board proper comprises a disk 10 having a spindle 11 which extends through the collar 12 of the hanger board 9, this collar being externally threaded at 13 for the reception of the nut 14, the latter having a split steel head 15 which bears against the end of the spindle 11 and tends to press the disk upward.

The numeral 16 indicates a second disk arranged above and spaced apart from the disk 10, this disk 16 having the compass C mounted thereon for the purpose hereinafter mentioned.

The map paper P is placed upon the upper face of the disk 10 and is adapted to be fed or moved past the point 17 of the pencil 18 as the vehicle travels. This pencil is sleeved by the spindle 11 of the map disk 10, extending through the bore of such sleeve as shown in Fig. 2. The butt of the pencil has an enlarged neck 19 which terminates in a conical head 20. A coil spring 21 normally tends to force the pencil downward, or to bring its point away from the under side of the map paper, but this tendency is counteracted by the leaf spring 22 which is fastened at 23 to the arm 24 depending from the hanger board 9, the free end of this spring bearing against the conical head 20 of the pencil and forcing the latter into marking or line-making engagement with the map paper.

Where it is desired to mark or indicate a certain point on the map line being made, this may be done by the operator pulling the cord 22' which runs through the eye 22", and is fastened at one end to the leaf spring 22. This results in such spring being drawn away from the pencil head, so that the coil spring 21 draws the pencil point away from the map paper and the map line is broken until the leaf spring is returned to engaging position with the pencil by releasing the pull on the cord. The break or blank in the map line indicates the desired point, such as a house or the like, along the route.

In order to feed the map paper P past the pencil, and thereby cause the map to be drawn upon the bottom face of the paper, we use the following means: Mounted upon the front axle 1 and turning therewith is a gear wheel 25 meshing with the pinion 26 of the flexible shaft 27, the opposite end of which shaft rotates in a bearing 28 and carries a pinion 29 meshing with the vertical gear wheel 30 which is carried on the shaft 31 journaled in the bearing 32 of the bracket plate 33, one of the side faces of this gear wheel 30 contacting with the toothed horizontally disposed beveled gear 34 so that motion is imparted to the latter. As will be seen by reference to Fig. 5, this latter gear carries the vertical spindle 35 which seats in the socket 36 of the worm shaft 37. This spindle 35 has a slot 38 therein, while 39 is a pin which extends into the slot and keys the worm shaft to the spindle so that the two will turn together. A coil spring 40 is interposed between the free end of the spindle and the closed end of the socket and normally tends to press the horizontal gear 34 downward into contact with the upper end of the pendulum T for the purpose hereinafter mentioned. The worm shaft 37 is mounted to turn in the bearing 41 carried by the hanger board 9 and is provided with the collars 42 and 43. The screw section of the worm shaft meshes with the worm gear 44 which is rotatably mounted in the bearing 45 by means of the tubular shank 46 which is integral with its gear 44 and is provided with the usual collar 47 for preventing the endwise movement of the shank in its bearing, while permitting the rotation thereof. Threaded through this shank 46 and adapted to feed longitudinally thereof is a screw shaft 48, the outer end of which is provided with a hand wheel 49. Between the rear end of this shaft 48 and the forward end of the rod 50 is interposed a section or block of rubber 51, or any other resilient element. As the rod 50 receives its longitudinal motion through the pushing action of the longitudinally moving shaft 48, such movement of the rod 50 is caused by the rubber block 51, to take place by short quick steps or intermittently, which we have found avoids any slipping of the paper moving disks 52, which are carried by the rod 50. As will be seen by reference to Fig. 2, we employ two of the paper moving disks. Each is in the nature of a small beveled toothed wheel carried at one end of a sleeve 53 which is held against longitudinal movement, but rotatable on the rod 50 by the pins 54. These disks lie at points on opposite sides of the center of the map board or disk 10 through the center hole 10' of which the pencil point 17 projects into marking contact with the under side of the paper P. It will further be seen that the top disk board 16 bears against the top of these paper moving disks 52, while the disks in turn bear on the paper P and map board 10, and as the disks 52 are rotatable on their rod 50, consequently when the top board 16 is rotated the map board is permitted to correspondingly rotate in the opposite direction. The under surface of the top disk is preferably formed of hard paper, fiber, or other material to provide a suitable friction surface, so that there will be no slip between the paper moving disks and the board 16. Furthermore, the map board 10, with its map paper P is kept in contact with these paper moving disks by the pressure of the split spring head of the nut 14 against the bottom of the spindle.

Mounted on the hanger board 9 and spanning the disks 10 and 16 is a spider frame S, having a ring-like hub 55, from which radiate the arms 56—56 and 57—57. The terminals of the pair of arms 57—57 are turned down and bolted to the body of the vehicle at 58, these arms having apertures 59 therein for the passage of the rod 50, while at 60 are shown adjustable guide screws for further confining the rod 50 in its proper path of longitudinal movement. The outer ends of the pair of arms 56—56 of the spider, are also turned down and bolted to the cross bar 9' of the hanger 8, as at 61, and these ends of the arms 56—56 carry bearings for the stud shafts 62 of the small gear pinions 63 which mesh with the circular racks 64—65, formed on the disks 10 and 16 respectively at the circumference thereof. Thus it will be noted that when the top board 16 is turned under the action of the compass, as hereinafter described, the lower or map board 10 will be correspondingly turned, but in the opposite direction.

In placing the paper P on the map board 10, the nut 14 is removed and the disk 10 dropped down away from the paper moving disks 52. The map paper is now slipped in on the board, and marked according to a diametrical line which has been etched permanently on that board to indicate a north-south direction, so that when several sheets of paper are to be pieced together to make a large complete map of a road, the "north" mark on one sheet may be placed against the "south" mark of the following sheet. After placing the paper, the nut 14 is tightened, and from the description thus far given it will be seen that the paper is fed past the pencil by means of the longitudinal movement of the rod 50 pushing the toothed disks 52—52 which engage the paper, this rod being actuated through the train of mechanism driven from the front axle as before described. Now, it is essential that there be no transverse tilting or inclination of the map-board 10 while directing the map, and this is avoided by means of the hanging frame 8, as by suspending the frame from the pintles 7 in the manner described it will always hang level, so far as any lateral inclination thereof is concerned.

When the screw shaft 48, pushing rod 50, has reached the limit of its inward travel, and the map line has been drawn completely across the paper, the hand wheel 49 contacts with and sounds the alarm bell L. The operator may then lift the latch bar 66 which is pivoted at 67 to the hanger frame 8, and thus release the latch bar from the notch 68 of the hand wheel and thereby permit the latter to be turned to rotate the shaft 48 and return the parts to their positions ready for the making of another map. It will be understood that while the shaft 48 is feeding inward, it is held against rotation by the latch bar engaging with the notch in the wheel. It will further be understood that so long as the machine is traveling on a level surface, and along a straight course, the disk 10 as well as the disk 16 are stationary and non-rotatable, and only a straight map line is marked on the paper as the latter moves past the pencil point. Should the machine, however, turn a corner or deviate from a straight line, this must, of course, be indicated upon this plan map, and consequently the map board 10 must turn as the pencil point is always stationary at the center of the board.

The necessary degree of rotation of the map board 10, is attained as follows: Mounted on the spider frame S is a small motor M, the shaft 70 of which is fluted and geared with the peripheral rack 72 of the disk 16. B indicates a battery connected by the line wire 72 with the motor, and by the wire 73 with the contact 74, projecting from the casing 75 of the azimuth stabilizer D, which latter is combined with the magnetic compass C. This azimuth stabilizer D comprises a set of two gyroscopes geared together, and as this device is well known to those skilled in the art, it need not be described in detail. Such a set of gyroscopes is not a compass in itself, but it has the well known property of maintaining for a long period and persisting with much power in the azimuth to which it has been set. From time to time at infrequent periods, it has to be set again in the chosen azimuth from which it has deviated, and this is done by the magnetic compass C. Before this is done, however, the machine carrying vehicle must always be placed in the same direction with respect to the poles, in order that the steel parts on the vehicle produce every time one and the same error on the magnetic compass. This error can be found once for all. There is mounted on the disk board 16 a pair of spaced contact bars 76—77 connected with the motor by the conducting wires 78 and 79 respectively, and between these contact bars 76 and 77, but out of contact with both of them, lies the contact 74 of the stabilizer casing when the machine is proceeding in a straight line. The hub 61 of the spider frame S is formed with a ball race or groove 80 in which the ball bearings 81 lie. The numeral 82 designates a supporting flange for the casing 75, having a groove 83, which forms the top of the ball race, the whole structure thus forming a ball bearing turn table for the casing 75. It will be seen that the shaft 84 of the disk 16, projects loosely through the center of the bottom of the stabilizer casing so as to revolve freely therein. Now, should the machine deviate from a straight line, as in turning a corner, the top disk will be carried along with it, while the stabilizer will persist in the position in which it is set, therefore, one of the contacts 76—77 will bring up against the contact bar 74 of the casing and the motor started by the closing of the circuit, and consequently the disk 16 with which it is geared, and the map board 10, geared to the disk 16, will also be turned. Of course, this turning of the map board 10 causes the map paper P to be turned relative to the pencil point, and, therefore, the turn in the road, or deviation from the straight line will be marked on the paper.

In this improved form, the error due to the non-horizontal measurement of the road by the wheel of the vehicle, is directly and automatically corrected on the map, while it is being drawn. This is done by means of the pendulum T. This pendulum, as may be seen from Fig. 2, determines by its position the length of the radii R and $r$ at which the disk 34 touches the disk 30. Referring to the diagrammatic Fig. 6, if the road $c$—$d$ for instance, is inclined at an angle $y$ with its horizontal length $c$—$e$, the pendulum will take the position represented by $x$ and the new radius $r$ at which the disk 34 touches the disk 30 will reduce the amount of the rectilinear motion of the map paper in the proportion $\frac{r}{R}$, and this proportion is the proper one because it is the proportion of the horizontal length of the road to the real length as measured off by the wheels of the vehicle. We have always the equation $$\frac{r}{R} = \frac{ce}{cd}.$$

Hence, whatever the inclination of the road whether up grade or down grade, the position of the pendulum will cause the rectilinear motion of the map paper to be always in proportion to the horizontal length of the road so that we get a correct plan projection of the length of the road on the map paper. This pendulum T is also used in this improved design for varying the scale at which the map is to be drawn. By means of the set screws 85, we can fix the pendulum at any height in its holder 86, so that the radius R, that is to say the variable part of the gear ratio by which we convert the length of travel into the rectilinear motion of the map paper, can be set to any desired extent, and consequently, a map of a predetermined scale or size may be made.

Referring to Fig. 1 of the drawings, it will be noted that we employ a leaf spring 33', which is fastened at one end to the bracket 33, the free end of said leaf spring bearing against the end of the shaft 31, which carries the gear wheel 30. This spring pressing against the shaft 31 causes the gear 30 to at all times bear against the periphery of the disk 34, and thereby any slip between the disks 30 and 34 is avoided. Moreover, the disk 34, it will be noted, is provided with peripheral teeth, while, if desired, the disk 30 may be faced with fiber or other material, so that a satisfactory frictional contact will at all times be maintained between the two disks 30 and 34.

In Figs. 7 to 10 inclusive, we have shown a modified form of machine, which is especially designed for making an elevation map. It will be noted that in making the elevation map, there is no necessity for employing in connection with the machine a pendulum for the purpose of obtaining a rectilinear motion proportional to the horizontal length of the road, inasmuch as rectilinear motion is always proportional to the inclined length of the road. Referring to these Figs. 7 to 10 inclusive, the body of the vehicle is designated by the reference character A', while the flexible shaft 85', which is driven from the axle of the vehicle carries at its free end a worm shaft 86', meshing with the worm gear 87 carried by the vertical spindle 88 which terminates at its upper end in a worm shaft 89 meshing with the gear wheel 90, so that rectilinear motion is imparted to the paper moving shafts 91 and 92 carrying the beveled paper moving wheels 93, in the manner described for the plan machine. This machine is also provided with the circular map board 94 and the top circular board 95 geared therewith as at 96 in substantially the manner described for the plan machine. The stationary pencil 97 which bears at its point against the bottom of the paper P', as shown especially in Fig. 10, is housed in the sleeve bearing 98, and carries at its lower end a horizontally disposed bevel gear 99 meshing with the vertically disposed bevel gear 100, the latter being mounted upon the shaft 101, carried by the bracket 102. This shaft 101 supports the swinging pendulum 103. This pendulum is employed for the purpose of producing the rotational motion of the boards 94 and 95 over an angle corresponding to the elevation angle of the road. In all other respects the construction of the machine for producing the elevation map is the same for making a plan map, and the principle of the friction wheels or disks producing longitudinal and rotational motion of the paper on the lower disk is the same in both machines.

In Fig 11 we have shown an arrangement for recording the route of travel of ships at sea. In this case a machine similar to the machine for making a plan map is employed, except that it is not mounted upon a vehicle, nor driven therefrom, but the flexible shaft 104 trails over the stern of the ship and its end in the water is connected with the speedometer 105, the revolution of the latter imparting motion to the shaft 104 to turn the worm shaft 106 meshing with the worm gear 107 which drives the worm shaft 108 meshing with the gear wheel 109, the motion of the latter feeding the shaft 110 which carries the paper moving disks 111. The letter C indicates an ordinary marine compass fastened at its lower end to the top revolving board 112, similar to the board 16, while the map board is shown at 113 and is similar to the map board 10. From this it will be seen that the motion imparted to the paper moving disks is received through the revolution of the speedometer 105, but the direction of the machine is otherwise the same as described for the vehicle-mounted machine.

Instead of the ordinary marine compass a repeating compass may be employed if desired, and in this instance the operation of the machine will be entirely automatic, for a repeating compass is moved, not by the operator, but by a motor commanded by the master compass of the ship.

It will, of course, be understood that in the construction of our invention, suitable arrangements are provided for taking up undue motion, and for this purpose dash pots and the like may be employed.

While we have herein shown and described certain preferred embodiments of our invention, we wish it to be understood that we do not limit ourselves to all the precise details of construction herein set forth by way of illustration, as modification and variation may be made without departing from the spirit of the invention or exceeding the scope of the appended claims.

What we claim is:

1. In a machine of the class described, the combination with a support, of a swinging frame carried thereby, a pair of horizontally disposed, rotatable, spaced boards carried by the frame, one of said boards constituting a map board, means for imparting a rotary motion to one of the boards, means interposed between the two boards for imparting the rotary motion of the aforementioned board to the other board, a drawing instrument, and means located between the two boards adapted to be operated to move a map along the map board bodily past the drawing instrument to mark the path of travel of the machine on the map.

2. In a device of the class described, the combination with a vehicle, of a map board rotatably mounted thereon, a drawing instrument, means operated on the movement of the vehicle for moving a map on the board past the drawing instrument, to mark the path of travel of the vehicle on the map, a rotatable board mounted above and arranged in driving connection with the map board, and means for turning the rotatable board whereby the map board is correspondingly turned.

3. In a device of the class described, the combination with a vehicle, of a longitudinally disposed map board rotatably mounted thereon, a drawing instrument, means operated on the movement of the vehicle for moving a map on the board past the drawing instrument to mark the path of travel of the vehicle on the map, a longitudinally disposed rotatable board arranged parallel with and in driving connection with the map board, means for turning the rotatable member whereby the map board is correspondingly turned, and a compass for determining the degree of rotation to be given the rotatable member.

4. In a machine of the class described, the combination with a vehicle, of a swinging frame suspended therefrom, a pair of horizontally disposed rotatable boards carried by the swinging frame, driving connections between the said boards, one of said boards constituting a map board, a drawing instrument, mechanism operated by the movement of the vehicle for moving a map along the map board past the drawing instrument to draw the path of movement of the vehicle, and means including a compass for maintaining the two boards constantly in a determined direction.

5. In a machine of the class described, the combination with a support, of a swinging frame suspended therefrom, a pair of horizontally disposed boards carried by the frame and mounted one above the other, one of said boards constituting a map board, a drawing instrument, mechanism for moving a map along the board bodily past the drawing instrument, and means including a compass for turning the boards and causing the map to be rotated with the map board.

6. In a machine of the class described, the combination with a support, of a pair of boards carried thereby and connected in driving relation, one of said boards constituting a map board, a drawing instrument arranged relative to the map board, a compass mounted upon the other board, a motor connected in driving relation with one of said boards, and means operated by the compass for energizing the motor to cause the rotation of the boards.

7. The combination with a vehicle, of a map board mounted thereon, a drawing instrument, means for embodying rectilinear motion to a map on the board to move such map bodily past the drawing instrument, and mechanism for reducing the rectilinear motion of the map in the proportion of the horizontal length of the road to the actual length thereof traveled by the vehicle.

8. The combination with a vehicle, of a map board mounted thereon, a drawing instrument, means for imparting rectilinear motion to a map on the board to move such map bodily past the drawing instrument, and mechanism including a pendulum device for reducing the rectilinear motion of the map in the proportion of the horizontal length of the road to the actual length thereof traveled by the vehicle.

9. In a machine of the class described, the combination with a vehicle, of a swinging frame suspended therefrom, a pair of horizontally disposed rotatable boards spaced apart and mounted one above the other, a drawing instrument arranged adjacent of the lowermost board, said lowermost board constituting a map board, mechanism operated by the movement of the vehicle for moving a map along the board bodily past the drawing instrument and longitudinally of the machine, gearing connecting the two boards in driving engagement, a compass mounted upon the uppermost board, a motor adapted when energized to rotate one of said boards and cause a corresponding rotation to be imparted to the other board, and means controlled by the compass for starting and stopping the motor.

10. The combination with a vehicle which has a rotatable, horizontally disposed map board mounted thereon, a marking instrument, a second rotatable board mounted above the map board, gearing connections between the two boards, whereby the rotation of one board will be imparted to the other board, a longitudinally movable shaft extending between the two boards, map moving disks carried by the shaft, mechanism operated by the movement of the vehicle for moving the longitudinal shaft and causing the disks to move the paper longitudinally and bodily past the drawing instrument, and means for rotating the two boards at predetermined times.

11. In a machine of the class described, the combination with a plurality of horizontally disposed members, one of which forms a map support, a drawing instrument, friction wheels disposed between said members and operated upon the movement of the vehicle for moving the map bodily past the drawing instrument, the rotation of said friction wheels being in a plane perpendicular to the map support, the longitudinal motion of said wheels being in a plane parallel to said map support.

12. The combination with a vehicle, of a rotatable map support, a drawing instrument, mechanism actuated by the movement of the vehicle for shifting the map along the support bodily past the drawing instrument, means including a compass for controlling the rotation of the map support, and mechanism for reducing the movement of the map bodily past the marking instrument in the proportion of the horizontal length of the road being measured to the actual length of such road.

In testimony whereof, we affix our signatures, in the presence of two witnesses.

THEODORE BODDE.
FRANK E. AUSTIN.

Witnesses for Theodore Bodde:
  A. K. GALE,
  WM. M. TOWNLEY.
Witnesses for Frank E. Austin:
  NEWTON A. FROST,
  EDWARD M. CARTER.